INVENTOR.
William Vangor
BY
Johnson and Kline
ATTORNEYS

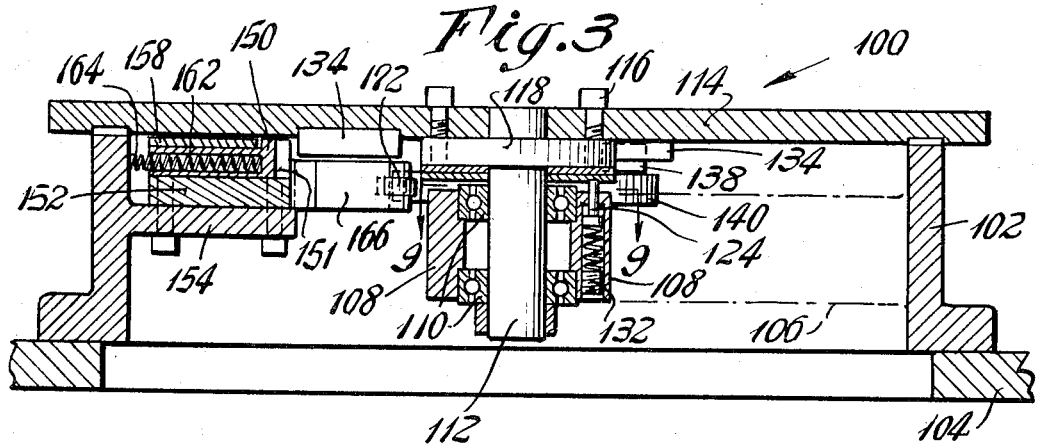
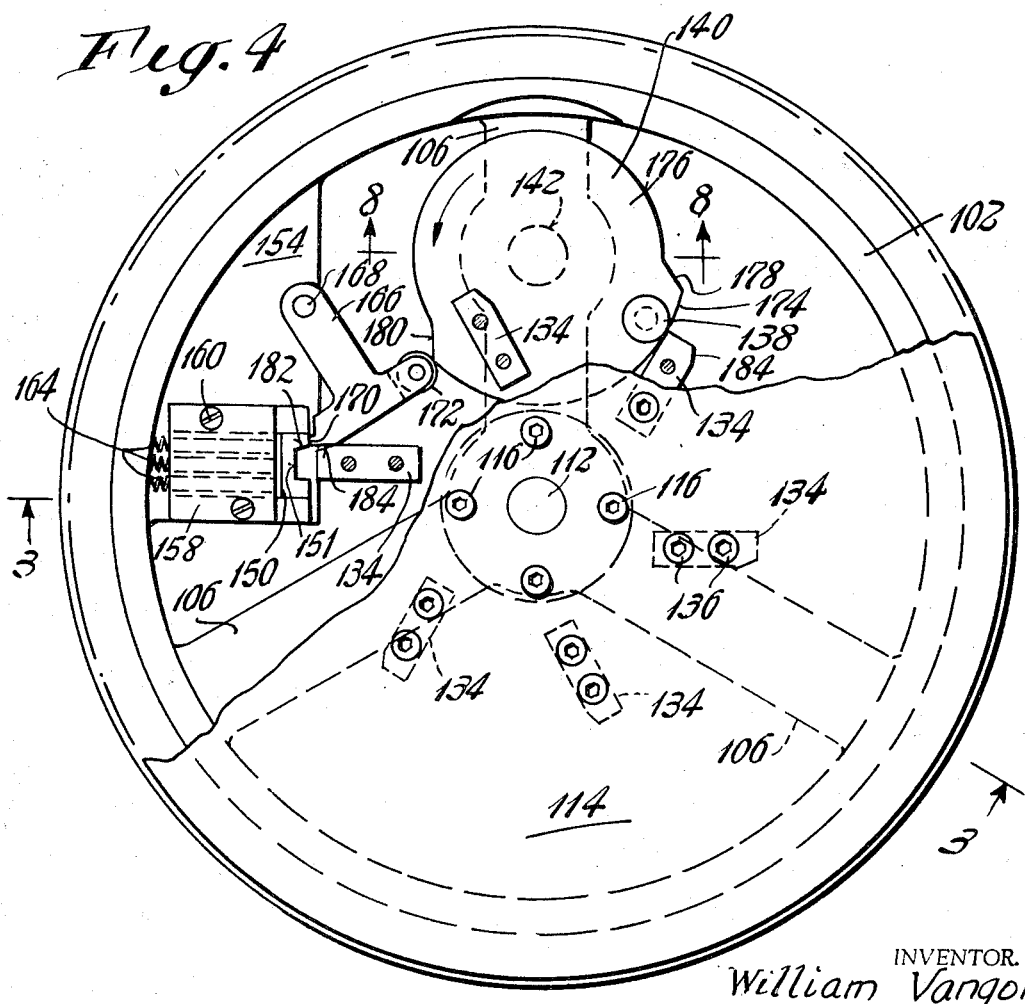

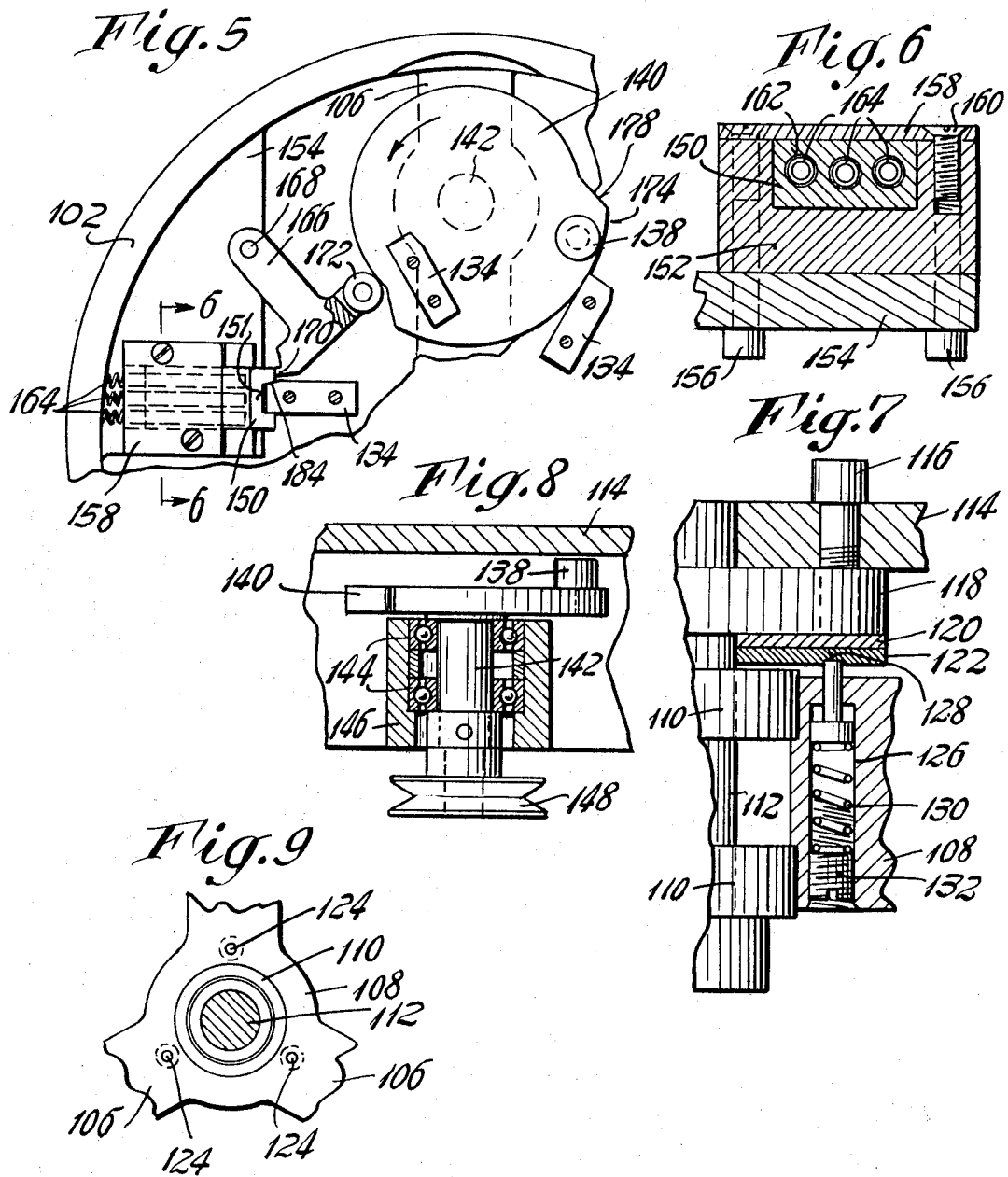

Fig. 10
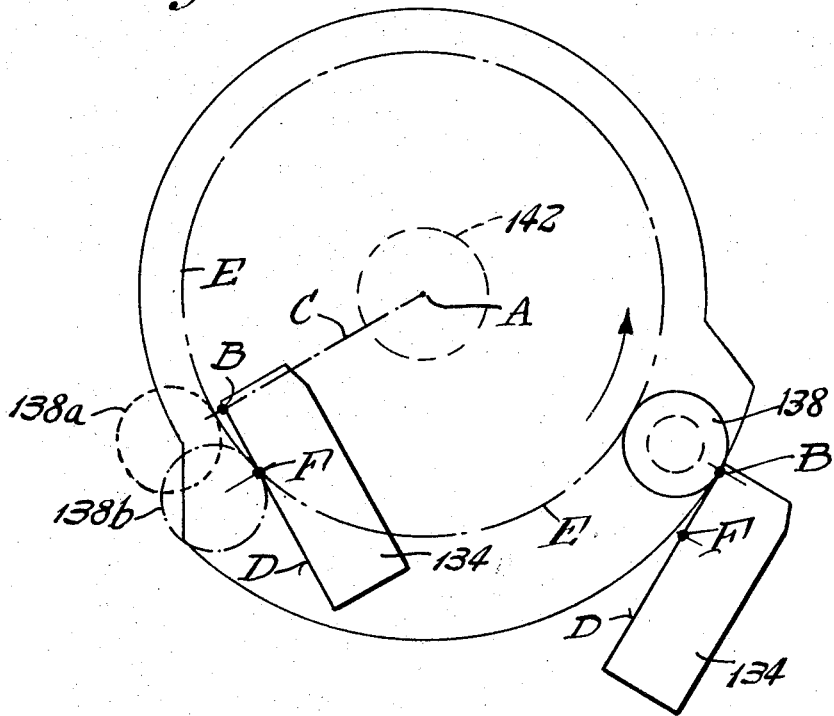
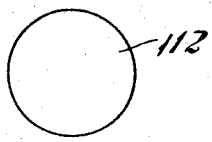
INVENTOR.
William Vangor 3,443,456
**APPARATUS FOR POSITIONING AND
INDEXING WORKPIECES**
William Vangor 325 High Ridge Road,
Fairfield, Conn. 06480
Continuation-in-part of application Ser. No. 373,338,
June 8, 1964. This application Sept. 15, 1966, Ser.
No. 579,694
Int. Cl. B23q 17/00
U.S. Cl. 74—822                     4 Claims

ABSTRACT OF THE DISCLOSURE

Apparatus for transporting and indexing workpieces in which the worktable is advanced step-by-step and has friction braking means continuously applied to it to arrest and hold it between stepping movements, there being also means for positively locking the worktable against movement between stepping operations.

---

This application is a continuation-in-part of my copending application Ser. No. 373,338 filed June 8, 1964, now Patent No. 3,309,944.

This invention relates generally to an apparatus for transporting workpieces successively to or from one or more work performing stations. More particularly, it relates to an apparatus for indexing workpieces successively in a circular path and accurately positioning the workpieces at the one or several working stations, as the case may be.

It is a principal object of this invention to provide an apparatus for indexing workpieces which reduces to a negligible minimum or substantially eliminates undesirable vibration or chattering in the workpieces during a work performing operation.

It is a further object of this invention to provide an apparatus for indexing workpieces which both accurately positions the workpieces at an appropriate working station and securely holds the workpieces thereat during a work performing period.

Apparatus of the general nature of this invention are well known in the art and find extensive utility in the field of automatic work performing machines which perform some type of operation on successively fed workpieces secured to a rotatably mounted carrier. While these apparatus have performed satisfactorily under certain types of operating conditions, I have found that they possess an inherent disadvantage when utilized in connection with machines which are intended to perform a highly precise operation and at relatively high rates of speed.

Under such conditions, for example high speed precision drilling, boring, reaming, tapping, etc., severe vibration or chattering may be imparted to the workpiece due to the fact that the carrier on which the workpiece is mounted is itself not securely held against minute amounts of movement. This in turn is due to the tolerances or clearances which must be maintained in the moving parts of prior art locking devices which are employed to hold the carrier stationary during the working operation. Since it is impossible to provide moving parts with an absolutely perfect or press fit, such vibration or chattering inevitably results on certain types of working operations.

This vibration, measured even in thousandths of an inch, is sufficient to cause severe wear, and even damage, to the working tools, and may also cause inaccurate work where a high degree of precision is required. Therefore, since the workpiece is rigidly held by the carrier, it is of the utmost importance to maintain the carrier absolutely immobile during the working operation.

I have discovered that this result can be accomplished by imposing a sustained drag on the carrier by the provision of a continuously engaged braking means having relatively movable friction elements which resist movement of the carrier. Since the carrier is generally moved through a relatively small arc with each indexing operation and is maintained stationary for a given period of time, it is feasible to provide a drive means which exerts a very high driving force over the small arc of movement of the carrier. Therefore, the braking means may be such as to exert a high degree of resistance to movement and yet not interfere with the operation of the drive means and the indexing movement of the carrier at the end of a working operation.

By proper design of the driving parts and appropriate adjustment of the braking parts, the carrier according to this invention is smoothly indexed from one position to another, promptly arrested at each succeeding position and held completely immobile at each position, thereby eliminating the vibration and chattering normally associated with other devices which permit free rotion of the carrier and utilize a mechanical locking means which is successively engaged and disengaged.

Another object of this invention is to provide an apparatus for indexing workpieces in which the final position of the carrier after each indexing movement is not affected by wear and tear on the driving parts so that indexing remains precise and accurate over the life of the apparatus.

To this end, a significant feature of the invention is the provision, in the drive means for the carrier, of means for causing a driving element to engage the abutment members on the carrier at a point on the abutment members which is spaced from the point at which the driving element leaves the abutment members so that any wear on the abutment members at the point of engagement by the driving element has no effect on the final position of the carrier for each indexing movement thereof.

Still another feature of this invention is the provision of a locking means effective to engage and disengage with a portion of the carrier in timed coordination with the disengagement and engagement respectively of the driving element with the carrier, the locking means acting in conjunction with the braking means to held the carrier stationary during the working period against lateral forces which would otherwise be sufficient to overcome the resistance of the braking means. Such forces arise, for example, from drilling or boring in a horizontal direction which is anything but radial in relation to the carrier, or from inserting one piece within another with a press fit where, due to the shape or contour of the pieces, lateral forces are developed.

These and other objects and features of the present invention will be more readily appreciated from an understanding of the following detailed description of this invention when considered in conjunction with the accompanying drawings in which:

FIGURE 1 is an elevation in section, taken on the line

1—1 of FIG. 2, illustrating one embodiment of the present invention;

FIG. 3 is a view similar to FIG. 1 taken on the line 3—3 of FIG. 4 illustrating another embodiment of the invention;

FIG. 4 is a plan view of the apparatus illustrated in FIG. 3 with a portion of the work supporting table or carrier broken away to show detail;

FIG. 5 is a fragmentary view of FIG. 4 showing the locking means in its engaged position;

FIG. 6 is a sectional view on an enlarged scale taken on the line 6—6 of FIG. 5.

FIG. 7 is a fragmentary sectional view on an enlarged scale of a portion of the braking means of the embodiment of FIG. 3;

FIG. 8 is a fragmentary sectional view taken on the line 8—8 of FIG. 4.

FIG. 9 is a fragmentary sectional view taken on the line 9—9 of FIG. 3; and

FIG. 10 is a diagrammatic view of the drive means of the embodiment of FIGS. 3–9, drawn to a greatly enlarged scale, illustrating the preferred manner of drive engagement and disengagement with the carrier.

Figure 1:
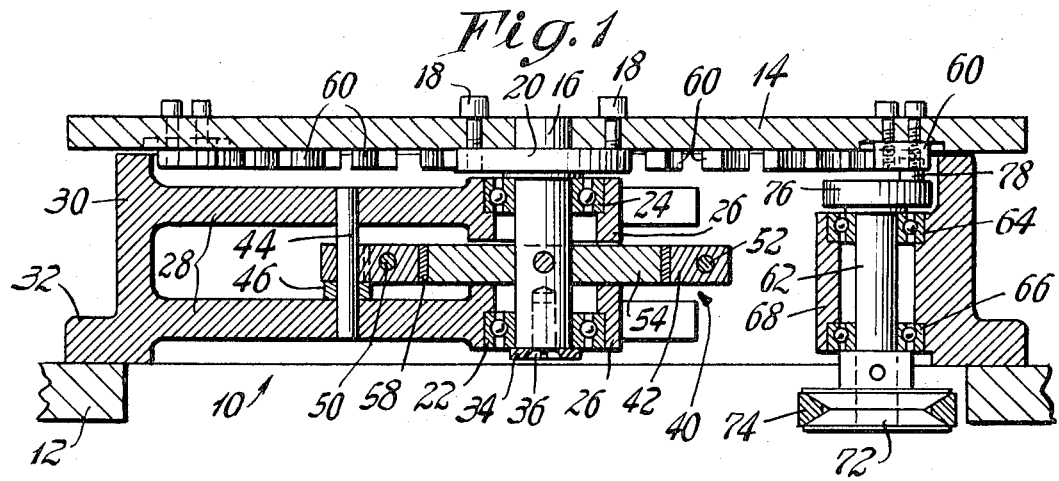
Figure 2:
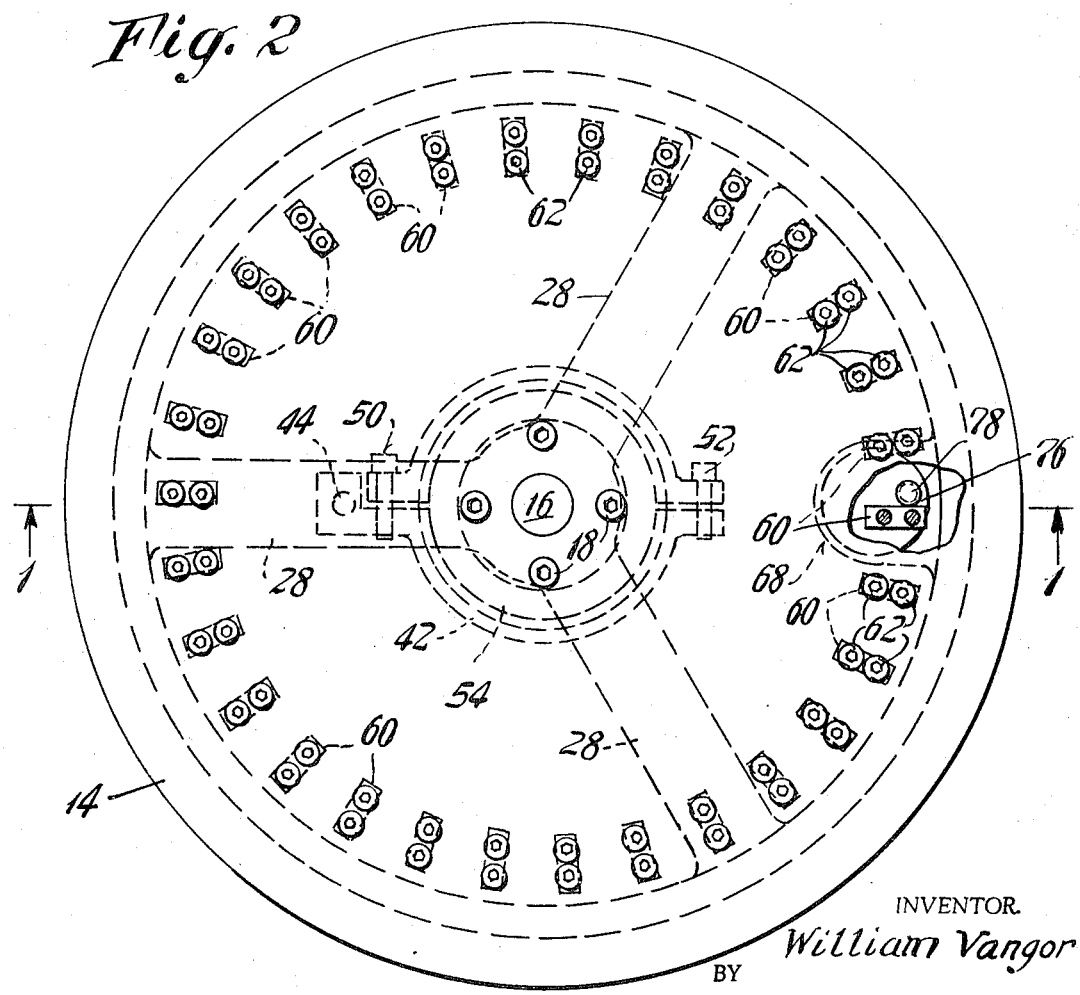
FIG. 2 is a plan view of the apparatus of FIG 1 with a small portion of the work supporting table or carrier broken away to show detail.

Referring now to the drawings and particularly to FIGS. 1 and 2, which illustrates the embodiment of the present invention, the reference numeral 10 indicates generally a workpiece transporting and indexing apparatus which may be conveniently mounted by any suitable means upon a portion of the framework 12 of a parent work performing machine, not shown. It is to be understood that the apparatus 10 may be incorporated as an integral component of the parent machine during the manufacture thereof, or may in the alternative be attached to the parent machine subsequent to manufacture thereof and either prior or subsequent to installation of the parent machine at the location of use.

The apparatus 10 is seen to comprise a workpiece supporting table 14 which is preferably of circular configuration and substantially flat. While the table 14 is illustrated as being mounted in a horizontal position, it will be apparent that the table, as well as the rest of the apparatus, may be disposed at any desired angle relative to a horizontal plane assuming the provision of suitable means for holding the workpieces or otherwise preventing them from falling off the table.

A central shaft 16 is suitably secured to the table such as by means of a plurality of bolts 18 which pass through the table and are threadedly engaged with a flange 20 on the shaft 16.

The shaft 16 is mounted for rotation by suitable means such as ball bearings 22 and 24 disposed in a bracket 26 which, in the illustrated emboliment, is formed by circular extensions of the bifurcated fingers 28 which extend radially inwardly from an annulus 30 which has a suitable mounting piece 32 for attaching the apparatus 10 to the framework 12 of a parent machine or which independently supports the apparatus. The members 26, 28, 30 and 32 constitute a frame for supporting the apparatus of this invention. A suitable securing means, such as a washer 34 and a screw 36, retain the ball bearing and shaft assembly together.

Interposed in operative relation between the shaft 16 and the frame members 28 is a motion arresting or braking means 40 which is seen to comprise a circular clamp consisting of one semicircular clamp member 42 secured to the frame fingers 28 by means of a pin 44 and a supporting boss 46. Another semicircular clamp member 48 is secured to the clamp member 42 by means of bolts 50 and 52 which pass through suitable radial extensions of the clamp members 42 and 48. The bolts 50 and 52 are threadedly engaged with the clamp member 42 to provide for adjustment of the braking effect as will hereinafter become more apparent.

A friction disc 54 is fixedly mounted on the shaft 16 by means of a pin 56 in inner concentric relation with the clamp 40. A suitable friction element 58, such as a fibre brake band, is interposed in contacting relationship between the clamp members 42 and 48 and the peripheral surface of the friction disc 54 for the purpose of gripping the friction disc 54 with sufficient force to prevent rotation thereof when no driving force is being applied to the table 14, and to offer substantial resistance to rotation of the disc 54 when a driving force is being applied to the table 14. As indicated briefly above, the holding force of the friction element 58 may be increased or decreased by appropriate adjustment of the bolts 50 and 52.

As best seen in FIG. 2, the table 14 is provided with a plurality of abutment members 60 which are circumferentially spaced apart adjacent or somewhat inwardly from the periphery of the table 14. The abutment members 60, which are of generally rectangular configuration, are secured preferably to the undersurface of the table 14 in any convenient manner such as by means of threaded bolts 62. The abutment members are placed apart a predetermined amount in accordance with the determinate arc through which the table will move in step-by-step fashion, and in accordance with the prescribed orbital path of a driving member as more fully explained hereinbelow.

Referring now to FIG. 1, it will be seen that the driving means is secured to the annulus or peripheral frame portion 30 in operative association with the abutment members 60. The driving means comprises a shaft 62 journaled for rotation in ball bearings 64 and 66 which are supported in a suitable bracket 68 secured to the inner wall of the annulus 30. The shaft 62 is provided with a drive pulley 72 for receiving a drive belt 74 which is driven from any suitable power take-off of the parent work performing machine or other suitable power supply means. Thus shaft 62 may be continuously or intermittently rotated depending on the situation in which it is used.

Secured to the upper end of the shaft 62 is a disc 76 having a pin or roller 78 or other suitable drive member eccentrically disposed on the disc 76 in such manner that rotation of the disc 76 moves the roller 78 in an orbital path about the central vertical axis of the shaft 62. As clearly seen in FIG. 2, the orbital path of the roller 78 intersects at least in part with the circular path of travel of the abutment members 60, the size, spacing and arrangement of the parts being such that the roller 78 will move a given abutment member 60 and the table 14 through a determinate arc upon each complete revolution of the disc 76 and orbit of the roller 78. The spacing between the abutment members 60 is such that a succeeding abutment member will be in position to be engaged by the roller 78 at the same instant that a prior abutment member has just been disengaged by the roller 78.

It will be readily apparent that, in the operation of the apparatus as thus far described, driving of the pulley 72 by the belt 74, either continuously or intermittently, will correspondingly rotate the shaft 62 and the disc 76 about the longitudinal axis of the shaft 62 thereby moving the roller 78 in an orbital path about said axis. As the pin 78 engages an abutment member 60, the vector angle of the driving force will be at a maximum relative to the direction of travel of an abutment member 60 thereby applying a minimum driving force to the abutment member. As the roller 78 begins to move the abutment member 60, the vector angle will gradually decrease to zero at which point the driving force is tangential to the direction of movement of the abutment member 60 and the velocity thereof will be at a maximum. As the roller 78 continues to move the abutment member 60, the vector angle of the driving force of the roller 78 will again increase to a maximum during which time the abutment member 60 and the table 14 will decelerate, the deceleration of these parts being assisted by the braking force of the braking means 40. As the roller 78 continues to orbit and passes out of engagement with the abutment member 60, the table 14 will immediately cease to move and will remain stationary throughout the remaining orbit of the roller 78 until the roller engages the next succeeding abutment member 60 to repeat the cycle of operation. It is apparent from the above that the roller 78 is operable through a portion of each revolution to engage and move any one of the abutment members 60 through a predetermined arc in opposition to the resistance of the braking means 40, and thereby to rotate the table 14 intermittently in response to successive rotations of the roller 78 in its orbital path.

FIGS. 3–9 illustrate another embodiment of the present invention having a modified form of braking means and also incorporating a locking means for resisting lateral forces otherwise strong enough to overcome the holding force of the braking means. In addition, FIG. 10 illustrates, in this embodiment, the means by which the driving member is caused to engage the abutment members at a point spaced from the point of disengagement so as to eliminate the effects of wear on the abutment member from the indexing of the carrier. It should be noted, however, that this feature is equally applicable to both embodiments of the invention.

Referring to FIGS. 3 and 4, the apparatus 100 of this embodiment comprises an annular frame 102 suitably secured to a portion 104 of a work performing machine, the frame also having radial legs 106 which converge to form a centrally located bracket 108. The bracket 108 is provided with suitable bearing elements 110 to permit free rotation therein of a shaft 112 which is rigidly secured to a work supporting table or carrier 114 by means of bolts 116 which extend through the carrier and are threadedly received in a disc 118 rigidly secured to, or formed integrally with the shaft 112.

The braking means of this embodiment, as best seen in FIG. 7, comprises generally a friction element secured to a portion of the carrier 114 and a contact element mounted on a portion of the frame and continuously urged into engagement with the friction element to resist movement of the carrier. More particularly, the friction element may comprise merely the undersurface of the disc 118, but more preferably is constituted by an annulus 120 which is loosely mounted on the shaft 112 and is formed of a material having a relatively high coefficient of friction. The contact member is a similar annulus 122 also loosely mounted on the shaft 112.

The annulus 122 is continuously urged into contact with the annulus 120 by a plurality of equispaced pressure members each of which comprises a headed pin 124 slidably received in a bore 128 provided in the bracket 108, the outermost end of each pin being received in a recess 128 formed in the annulus 122, which is thereby held stationary. Each pin 124 is urged upwardly by a spring 130 which is held in the bore by a set screw 132, the latter being thready secured in the bore 126 to permit adjustment of the compression of the spring 130. As seen in FIG. 9, there are three such pressure members arranged around the shaft 112, but any desired number may be provided.

As the shaft 112 and the disc 118 are rotated, the annulus 122 maintains a continuous drag on the annulus 120, which latter annulus will rotate or remain stationary depending on the relative amount of friction at the interface between the two annuli and between the annulus 120 and the lower planar surface of the disc 118.

In order to index the carrier 114 to successive positions, a drive means is provided which comprises an annular series of equispaced rectangular abutment members 134 which are disposed substantially radially relative to the carrier 114. The abutment members, of which only six are illustrated in this embodiment, are secured to the undersurface of the carrier 114 by bolts 136, or they may be formed integrally with the carrier 114.

The drive means further comprises a driving member in the form of a pin or roller 138 eccentrically mounted on a disc 140, the later being fast on a shaft 142 which is journaled for rotation in bearings 144 mounted in a suitable housing 146 which is formed as part of one of the legs 106. The shaft 142 is driven by a pulley 148 or by any other suitable source of power.

It will be apparent from FIGS. 4 and 5 that, as the disc 140 and roller 138 rotate, the path of rotation of the roller 138 intersects the path of movement of the abutbent members 134 over a portion of each revolution of the roller 138, so that the roller 138 engages with the successive abutment members 134 to index the carrier from one predetermined position to another with each revolution of the roller 138.

As briefly indicated hereinabove, a locking means is provided to operate in coordination with the drive means to hold the carrier stationary during the working operation in the event that such operation produces lateral forces on the workpiece sufficient to overcome the resistance to movement of the carrier provided by the braking means described above. Referring to FIG. 4, the locking means comprises a slide element 150 having a recess 151 formed in one face of the slide element, the recess 151 being shaped complementary to one end of the abutment members 134. The slide element 150, as best seen in FIG. 6, is slidably received in a block 152 secured to a shelf 154 as by bolts 156, the shelf 154 forming part of the frame 102. A plate 158 secured to the block 152, as by the screws 160, retains the slide element 150 in place. The slide element 150 is provided with a plurality of bores 162 which receive springs 164 for the purpose of continuously urging the slide element 150 toward the abutment members 134.

The slide element 150 is actuated between locking and releasing positions by an actuating means which comprises a cam operated, movably mounted member which moves the slide element 150 back and forth in response to movement caused by a cam. In the form illustrated, the movable member is a substantially T-shaped lever 166 which is pivoted as at 168 on the shelf 154 and has a projection 170 for engagement with the outer edge of the slide element 150. Opposite the projection 170, a roller 172 is suitably secured to the lever and is adapted to follow the peripheral surface of the disc 140 which is secured to the shaft 142. As best seen in FIGS. 4 and 5, the periphery of the disc 140 is provided with a lobed surface 174 and a recessed surface 176 which meet at opposite ends respectively by inclined surfaces 178 and 180.

It will be clearly seen by a comparison of FIGS. 4 and 5 that, as the disc 140 rotates counterclockwise as indicated by the arrow, the position of the disc in FIG. 4 being that assumed when the carrier 114 has just reached the end of an indexing movement, the roller 172 is about to start down the inclined surface 180, which permits the slide element 150 to move toward the right under the influence of the springs 164 so that the recess 152 engages the outer edge of an abutment member 134, as illustrated in FIG. 5.

Upon continued rotation of the disc 140, the inclined surface 178 will engage the roller 172 and cause the lever 166 to move, thereby moving the slide element 150 toward the left to disengage the slide element from the abutment member. The inclined surfaces 178 and 180 and the roller 138 are all positioned on the disc 140 such that the movement of the slide element 150 is synchronized with the engagement and disengagement of the roller 138 with a next succeeding abutment member so that the locking means becomes effective substantially at the instant that the carrier 114 comes to rest under the influence of the braking means, and is rendered ineffective substantially at the instant that the carrier 114 is caused to commence another indexing movement.

The slide element 150 and the abutment members 134 are each provided with a chamfered surface 182 and 184 respectively so that these parts engage with a wedge fit. Thus, there is no possibility of any relative movement at least between the slide element and the abutment members.

FIG. 10 illustrates on an enlarged scale the feature of this invention relating to precise indexing of the carrier over the life of the apparatus by eliminating the effect of wear on the abutment members from the final position of the carrier at the end of each indexing movement. It has been customary to arrange the driving parts in such a way that the driving element contacts an abutment member on a point at which the arc of movement of the inner periphery of the driving element is tangential to the side face of the abutment member. This is the same point at which the outer periphery driving element becomes disengaged from the abutment member. Thus any wear on the abutment member caused by repeated contact by the driving element over an extensive period of time results in the carrier not being moved to the final desired position, and this in turn results in inaccurate work which, measured even in thousandths of an inch, may be intolerable.

To overcome this, I have arranged the relative positions of the driving roller and the abutment members so that the former does not initially contact the latter at the above-mentioned point of tangency but rather at a point spaced therefrom. Since the drive roller will always become disengaged from the abutment member at the point of tangency, any wear at a different location on the abutment member will have no effect on the final position of the carrier at the end of an indexing movement.

Referring now to FIG. 10, it will be seen that the drive shaft 142 is mounted to have its axis A disposed in relation to the abutment members 134 so as to define a point of tangency B at the intersection of a radius C between the axis A of the drive shaft and the contact face D of the abutment members 134 when the radius C is perpendicular to the contact face D. This point B is the point at which the roller 138 would customarily contact the abutment member and consequently is the point at which wear is caused.

However, the roller 138 is mounted to move in a path such that the arc E of the innermost periphery of the roller lies beyond the point B when measured along the radius C while said radius remains perpendicular to the contact face D. This condition exists only when the outer periphery of the roller 138 has moved the preceding abutment member to its terminal position by virtue of continued contact between the roller 138 and the contact face D of the abutment member until the point of tangency B is reached, at which point the roller 138 becomes disengaged from the contact member.

In other words, the distance between the axis A of the drive shaft and the inner periphery arc E of the roller 138 is caused to be slightly in excess of the distance between the axis A and the point of tangency B when the abutment members are in their terminal position, i.e., when the radius C is perpendicular to the contact face D. Under these circumstances, the roller 138 must travel from the postion 138a to the position 138b before it contacts the face D of the abutment members. It is apparent that the roller 138 now makes initial contact with the abutment member 134 at the point F and that wear from repeated contact will occur at this point. However, as the indexing movement is completed, the roller passes the point F and remains in engagement with the face D of the abutment member until the point B is reached so that the abutment member and the carrier are moved to precisely the same location for indexing regardless of the extent of wear on the abutment members at the points F.

It is to be understood that the invention is not limited to the specific embodiments illustrated and described herein but is intended to cover all such modifications and variations thereof as may be deemed to be within the scope of the appended claims.

I claim:

1. Apparatus for transporting and indexing workpieces comprising a frame; a workpiece supporting carrier rotatably supported by said frame; an annular series of equispaced rectangular abutment members extending generally radially on said carrier; power means; driving means including a drive shaft driven by said power means and journaled for rotation on said frame, a disc secured to said shaft adjacent the abutment members on said carrier; and a roller eccentrically carried by said disc to engage and disengage one of said abutment members in driving and nondriving relationship therewith during each revolution of said driving member whereby said carrier is caused to rotate intermittently in response to successive rotations of said driving member, said drive shaft being mounted to have its axis disposed in relation to one end of the abutment members so as to define a point of tangency at the intersection of a raduis between the axis of said drive shaft and the contact edge of said abutment members when said radius is perpendicular to said contact edge, the distance between the axis of said shaft and the inner periphery of said roller measured along said radius being slightly in excess of the distance between said axis and said point of tangency when said radius is perpendicular to said contact edge so that said roller moves beyond said point of tangency before contacting said abutment member.

2. Apparatus for transporting and indexing workpieces comprising a frame; a workpiece supporting carrier rotatably supported by said frame; an annular series of equispaced abutment members on said carrier; driving means mounted on said frame and including a driving member constrained to move in a circular path so as to engage and disengage one of said abutment members in driving and nondriving relationship therewith during each revolution of said driving member whereby said carrier is caused to rotate intermittently in response to successive rotations of said driving member; and braking means for maintaining a continuous drag on said carrier so as to arrest and hold the carrier against movement when said driving member becomes disengaged with said abutment members, said braking means comprising a friction disc secured to said carrier and having an annular planar friction surface, pressure means including support means on said frame, a plurality of adjustable equispaced pressure members carried by said support means and a contact element on the frame interposed between said pressure members and said disc and having a complementary annular planar friction surface for engagement with the friction surface of said disc.

3. Apparatus for transporting and indexing workpieces comprising a frame; a workpiece supporting carrier rotatably supported by said frame; an annular series of equispaced abutment members on said carrier; driving means mounted on said frame and including a driving member constrained to move in a circular path so as to engage and disengage one of said abutment members in driving and nondriving relationship therewith during each revolution of said driving member whereby said carrier is caused to rotate intermittently in response to successive rotations of said driving member; and locking means interconnected between said frame and said carrier comprising a slide having a recess shaped to receive a portion of said abutment members, spring means normally urging said slide into engagement with said abutment members, actuating means comprising an actuating member mounted for movement on said frame in position to engage said slide to move the latter against the force of said spring means out of engagement with said abutment members, and cam means carried by a portion of said drive means and rotatable in synchronism with said driving member for operating said actuating member, said cam means having a lobed surface engageable with said actuating member for moving the latter to disengage said slide from said abutment members and to permit re-engagement thereof in synchronism with the engagement and disengagement respectively of said driving member with said abutment members.

4. Apparatus as set forth in claim 3 wherein at least one side of said recess on said slide and at least one side of said abutment members are chamfered whereby said recess and said abutment members engage with a wedge fit.

References Cited

UNITED STATES PATENTS

| | | | |
|---|---|---|---|
| 1,421,241 | 6/1922 | Ingham | 188—83 |
| 2,757,559 | 8/1956 | Carpenter | 74—820 |
| 3,142,942 | 8/1964 | Celovsky | 74—824 XR |

HALL C. COE, *Primary Examiner.*

U.S. Cl. X.R.

74—824; 188—83